United States Patent [19]
Latham, Jr.

[11] Patent Number: 5,143,178
[45] Date of Patent: Sep. 1, 1992

[54] FLUID COLLECTION AND DRAINAGE PAN

[76] Inventor: Andrew V. Latham, Jr., 545 Abbott Ave., Ridgefield, N.J. 07657

[21] Appl. No.: 442,422

[22] Filed: Nov. 22, 1989

Related U.S. Application Data

[63] Continuation of Ser. No. 173,289, Mar. 25, 1988, abandoned.

[51] Int. Cl.⁵ .............................................. F01M 11/00
[52] U.S. Cl. ...................................... 184/106; 184/1.5; 141/98; 141/340
[58] Field of Search .................. 184/1.5, 106, 109; 220/1 C; 206/509, 511; 141/98, 331, 333, 340, 342

[56] References Cited

U.S. PATENT DOCUMENTS

| | | | |
|---|---|---|---|
| 1,063,724 | 6/1913 | Patterson | 220/1 C |
| 1,521,212 | 12/1924 | Allen | 141/340 |
| 1,554,589 | 9/1925 | Long | 284/1.5 |
| 1,725,622 | 8/1929 | Dematteis | 141/344 |
| 1,962,908 | 6/1934 | Pierson | 184/106 |
| 3,834,527 | 9/1974 | Howe | 184/106 |
| 4,054,184 | 10/1977 | Marcinko | 184/106 |
| 4,274,645 | 6/1981 | Ferguson et al. | 184/106 |
| 4,408,642 | 10/1983 | Jeruzal et al. | 184/106 |
| 4,533,042 | 8/1985 | Pollacco | 184/106 |

*Primary Examiner*—Leonard E. Smith
*Attorney, Agent, or Firm*—Davis Hoxie Faithfull & Hapgood

[57] ABSTRACT

A fluid collection and drainage pan is provided for collecting fluids such as oil drained from engine components and the like placed in the pan. The drainage pan is mountable directly on top of the inlet end of a variety of standard capacity fluid storage drums or barrels and provides for the direct flow into the drum of fluid drained into the pan.

15 Claims, 3 Drawing Sheets

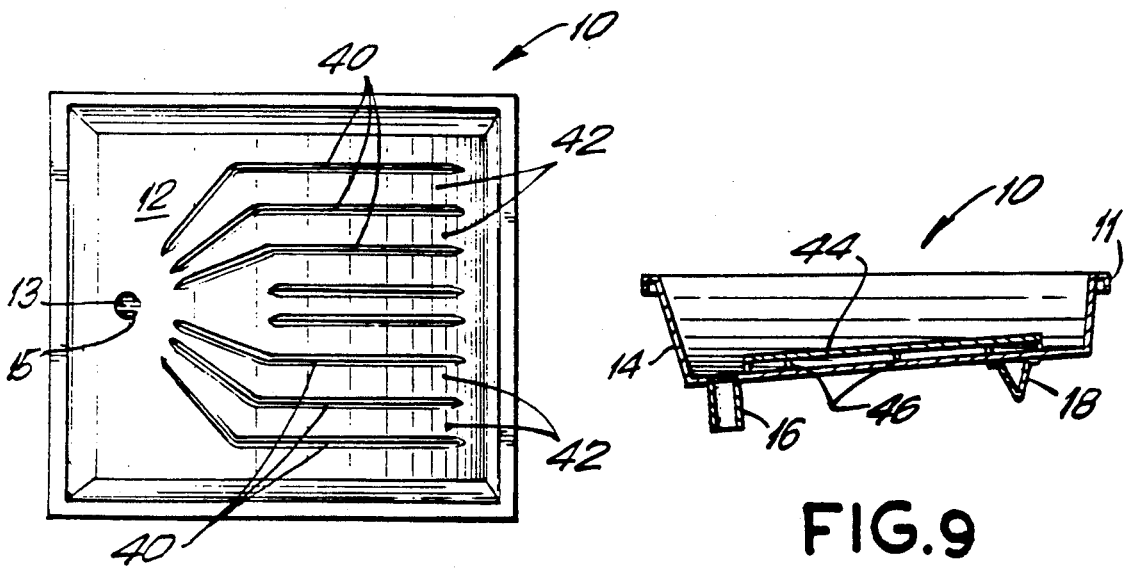
FIG.8
FIG.9
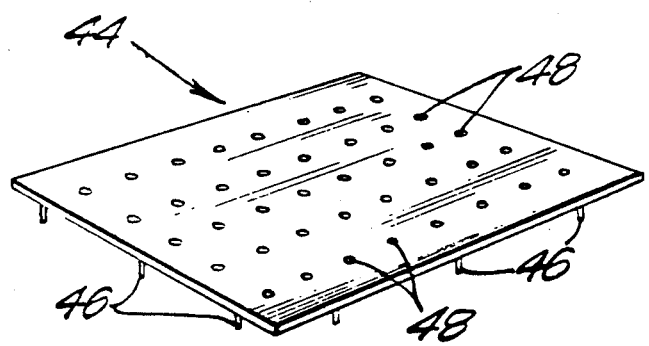
FIG.10
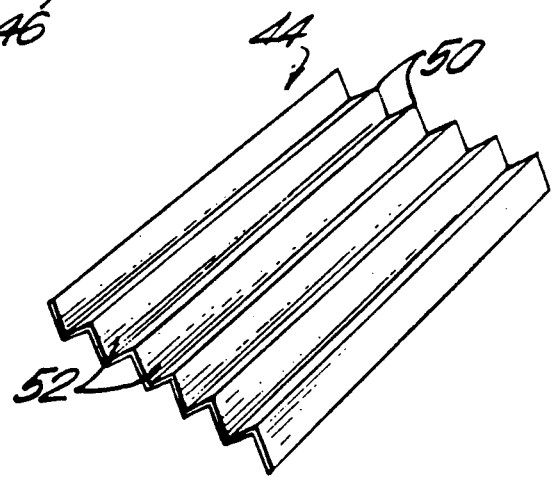
FIG.11

FLUID COLLECTION AND DRAINAGE PAN

This is a continuation of co-pending application Ser. No. 173,289 filed on Mar. 25, 1988 now abandoned.

BACKGROUND OF THE INVENTION

1. Field of the Invention

This invention relates generally to apparatus for draining viscous fluids such as oil and the like from various mechanical and electro-mechanical components such as internal combustion engine parts. More particularly, the invention pertains to a fluid drainage pan which facilitates the drainage of oil from internal combustion engine and engine-related parts such as cylinder heads, cam shafts and oil filters and the direct transfer of the oil to a standard size collection drum for recycling.

2. Description of the Related Art

Associated with the general maintenance and repair of internal combustion engines is the need to remove various viscous fluids such as spent or used engine oil, transmission fluid, and brake cylinder fluid before maintenance and repair of the engine components associated with these fluids can be performed. For example, it is often necessary to remove all oil and engine grime from engine components in order to rebuild the components or to adjust tolerances between moving component parts. Additionally, government regulations in some localities now require that spent oil be collected for reprocessing rather than discharged into the environment, as had previously been permitted.

Prior to the development of the present invention, mechanics would collect oil for reprocessing by using simple funnels inserted into storage drums to collect oil drained from engine crankcases and filters. Mechanics would also make an effort to drain oil into the funnels from larger engine components such as cylinder heads and cam shafts by holding, to the extent possible, the engine components over the funnel for a period of time. However, because many engine components are awkward in size and/or quite heavy, oil collection in this manner has not been very successful. As a result, unnecessarily large quantities of oil have to be removed from these engine parts by immersion or rinsing in chemical solvent baths. Use of the solvent baths to remove oil which could otherwise be drained if proper facilities existed is undesirable because it results in excessive use of solvent in order to adequately cleanse the engine parts and undue contamination of the solvent bath. This wasteful use of solvent is both exceedingly costly and a hindrance to the efficient operation of the repair facility, as only a few engine parts can be cleansed in the solvent bath at any one time due to space limitations in the bath and the frequent need to replace bath solvent due to oil contamination.

One example of a funnel used for transferring fluid into a storage receptacle is disclosed in U.S. Pat. No. 1,725,622. The panel disclosed in this patent is provided for filling generally rectangular receptacles that are filled while in position in a shipping container. The funnel includes a funnel body formed from a container similar to that to be filled having at one of its corners a reduced funnel mouth for insertion into the opening of a can to be filled and support legs positioned at each of the three remaining corners. The support leg diametrically opposed from the funnel mouth includes a compressed spring assembly which provides for tilting of the funnel body toward the funnel mouth as the fluid level, and therefore the weight of the fluid, within the funnel body diminishes as fluid is transferred into the storage receptacle. A remotely controlled valve is provided at the opening from the funnel body into the funnel mouth to control the flow of fluid through the funnel mouth.

U.S. Pat. No. 1,521,212 provides a funnel for filling drums or barrels that are oriented in a horizontal rather than a vertical position. The funnel includes a funnel body which is supported above the horizontally-oriented drum by a pair of spaced apart, parallel legs that extend the length of the funnel body. A rigid spout extends downwardly from one end of the funnel and is bent so as to extend in a direction generally parallel to the bottom of the funnel body so that it can be inserted into the drum inlet.

U.S. Patent No. 1,554,589 relates to a portable oil drain pan for receiving spent oil drained from engine crankcases. The pan is mounted on rollers and includes a funnel which directs oil drained into the pan to a storage tank associated with the drain pan. A sealable drain pipe extending from the storage tank provides for drainage of the spent oil from the storage tank into another vessel. However, neither this patent, nor any of the references described above, discloses a fluid drainage apparatus for draining spent oil and the like from large engine components directly into a storage vessel such as a standard 55 gallon drum for recycling.

Accordingly, it is an object to the invention to provide a fluid drainage pan which facilitates the drainage of viscous fluids such as engine oil from components placed inside the pan.

Another object of the present invention is to provide a simple, easy to use fluid drainage pan which provides for the drainage of oil from even large engine components prior to subsequent solvent cleansing of these components.

Yet another object of the present invention is to provide a fluid drainage pan which can be securely mounted on top of a fluid collection vessel such as a standard 55 gallon drum to provide for direct transfer of fluid drained from components placed inside the pan into the collection vessel.

These and other objects and advantages of the subject invention will become apparent from the detailed description set forth below.

SUMMARY OF THE INVENTION

The invention relates to a drainage pan for receiving fluid drained from one or more components positioned in the pan and for transferring the fluid to a conventional fluid storage drum of the type which include a sealable fluid inlet and a circumferential rim formed at the end of the drum. The drainage pan is mountable along the drum end adjacent the inlet and includes a tray bottom having a drainage aperture formed therein adjacent a front end of the tray bottom and a tray sidewall that extends generally vertically from the tray bottom. A drainage conduit extends outwardly from the drainage aperture and is insertable into the drum inlet for transferring fluid drained from the drainage pan into the storage drum. A support member adapted to securely engage the drum rim is provided for supporting and elevating the end of the drainage pan opposite the drainage outlet. The drainage conduit can be a rigid tube formed from metal, fiberglass or a suitable plastic that is permanently bonded to the tray bottom. Preferably, the drainage pan is formed in its entirety from metal, although other suitably rigid materials can be used. A variety of welding techniques, such as metallic inert gas, tungsten inert art gas, helium shroud, hot gas and hot welding can be used to bond the metal drainage conduit and metal support member to the tray bottom.

The drainage conduit can be cylindrical in cross-section and can be tapered along at least a portion of its length so that the free end of the conduit that is insertable into the drum inlet is provided with a diameter that is less than the diameter of the conduit end bonded to the tray bottom. A restricting device such as a strainer can be positioned adjacent the drainage aperture to prevent passage into the drainage conduit of objects having a diameter that is greater than a predetermined value.

At least a portion of the interior surface of the drainage pan formed by the tray bottom can be provided with a ridged or corrugated surface to direct fluid drained into the pan toward the drainage aperture. Additionally, a drainage plate can be provided which is insertable into the drainage pan for placement on top of the tray bottom. The drainage plate can be provided with a ridged or corrugated configuration, or can be provided with a plurality of perforations to facilitate the drainage of fluid from components placed on the plate.

In a preferred aspect of the invention, the support member tilts the back end of the drainage pan upwardly relative to the front end at a rate of approximately one inch per linear foot of the tray bottom. The support member preferably includes one or more pairs of notched recesses appropriately spaced to engage the circumferential rim of a variety of standard capacity storage drums so as to securely mount the drainage pan on top of the inlet end of the storage drum. Preferably, the support member is formed from metal and is of a V-shaped configuration and welded to the lower surface of the tray bottom.

BRIEF DESCRIPTION OF THE DRAWINGS

Further objects and advantages of the present invention will become apparent to those skilled in the art from the following detailed description taken in conjunction with the drawings, in which:

FIG. 8 is a top view of the interior of one embodiment of the drainage pan;

FIG. 9 is a schematic sectional view of another embodiment of the drainage pan of the present invention;

FIG. 10 is a perspective view of one embodiment of a drainage plate insertable into the drainage pan depicted in FIG. 9; and FIG. 11 is a perspective view of another embodiment of a drainage plate insertable into the drainage pan depicted in FIG. 8.

DETAILED DESCRIPTION OF THE PREFERRED EMBODIMENTS

Figure 1:
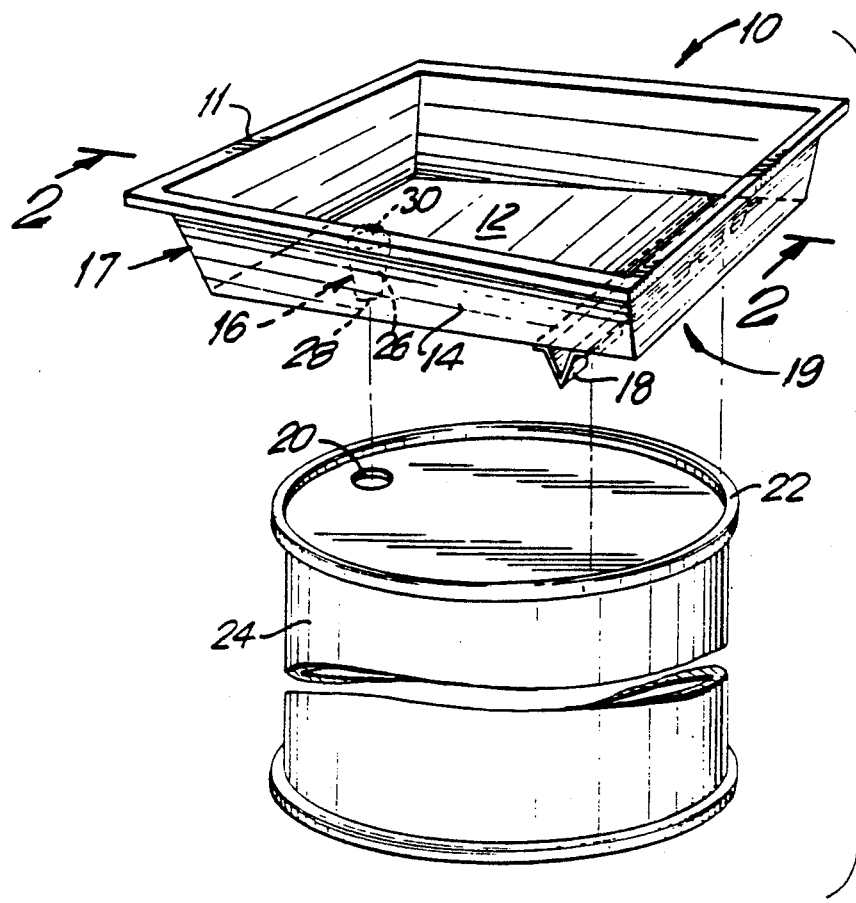
FIG. 1 is a perspective view of the drainage pan of the subject invention associated with a standard volume fluid storage drum.
Figure 2:
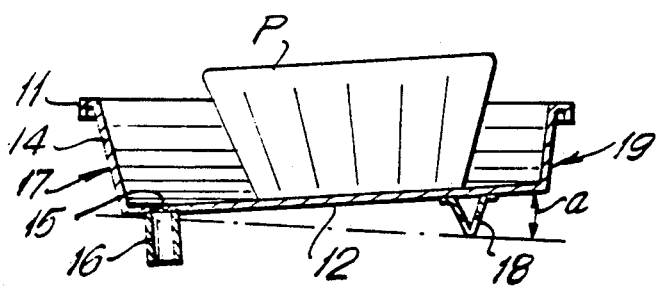
FIG. 2 is a sectional view along the line 2—2 of FIG. 1.
Figure 3:
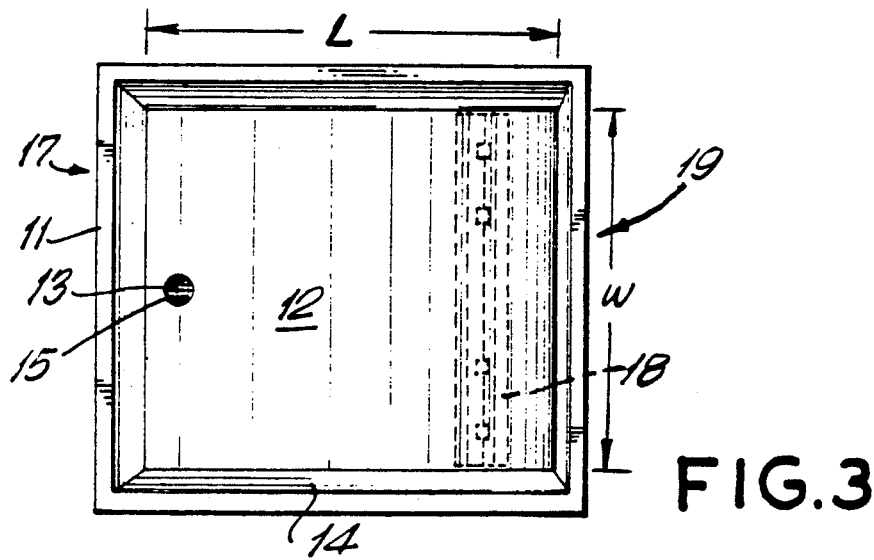
FIG. 3 is a top view of the drainage pan of FIG. 1.

Referring to the drawings in detail, wherein like reference numerals designate corresponding parts throughout the several views, and particularly to FIGS. 1-3, there is shown a drainage pan, depicted generally by reference numeral 10, for receiving fluids such as oil drained from components such as internal combustion engine parts P placed inside the pan. The drainage pan 10 includes a tray bottom 12 and a side wall 14 extending generally vertically upward from the tray bottom 12. The free end 11 of the side wall 14 can be rolled or turned to provide additional rigidity. The tray bottom 12 includes a drainage aperture 15 formed therein adjacent the front end 17 of the tray bottom. A drainage conduit 16 is continuous with the drainage aperture 15 and extends outwardly from the tray bottom 12 in a direction generally opposite that of the tray side wall 14. A strainer 13 extending across the aperture 15 can be provided to prevent passage into the drainage conduit 16 of items larger than a predetermined size. Mounted adjacent the back end of the tray bottom 12 and extending generally across the tray bottom is a support member 18. The support member 18 extends outwardly from the lower surface of tray bottom 12 in a direction generally parallel to that of the drainage conduit 16. The drainage conduit 16 and support member 18, respectively, are configured to cooperate with the inlet aperture 20 and circumferential rim 22 of any one of a variety of standard capacity fluid collection drums, as is described in greater detail below.

Figure 4:
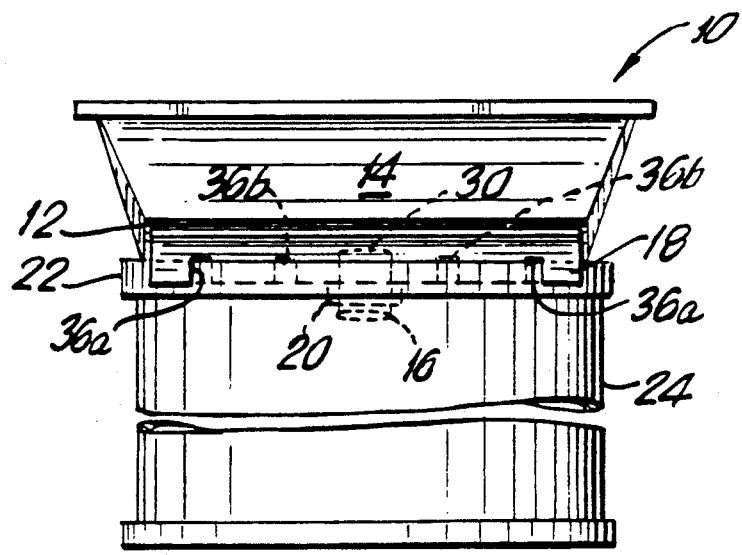
FIG. 4 is a back elevational view of the drainage pan and storage drum of FIG. 1.
Figure 5:
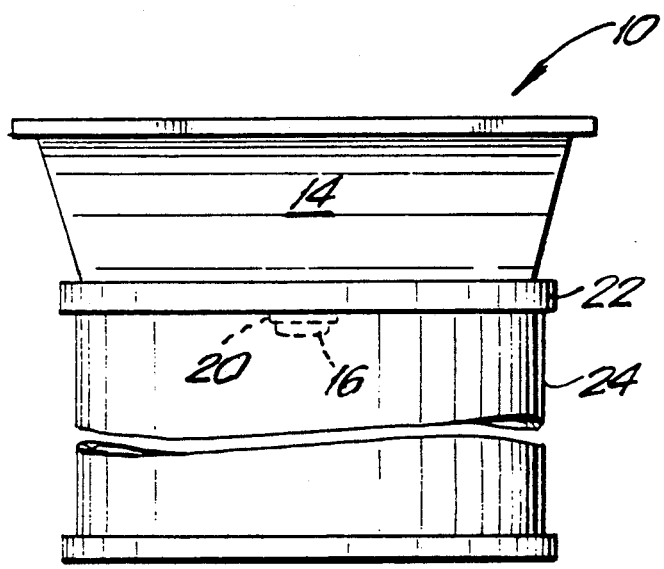
FIG. 5 is a front elevational view of the drainage pan and storage drum of FIG. 1.
Figure 6:
FIG. 6 is a cross-sectional view of a support member which support a back end of the drainage pan.
Figure 7:
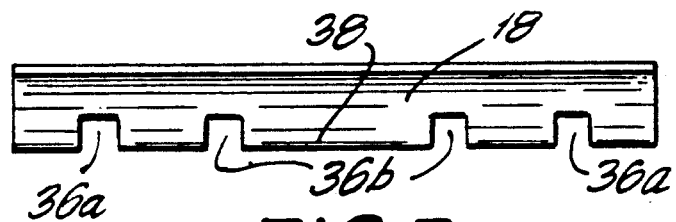
FIG. 7 is a side view of the support member depicted in FIG. 6.

With reference to FIGS. 1, 4 and 5, the drainage conduit 16 is appropriately dimensioned so that it can be inserted into the inlet 20 of a standard drum 24. The drainage conduit 16 is preferably provided with a cylindrical cross-sectional configuration so as to correspond to the shape of the standard inlet 20 of a conventional drum 24. The side wall 26 of the drainage conduit 16 can be angled so as to provide a narrowing in cross-section at the discharge end 28 of the conduit 16 relative to the inlet end 30, as illustrated in FIG. 1, in order to facilitate its insertion into the drum inlet 20. Alternatively, the conduit side wall 26 can be configured to provide a uniform cross-sectional diameter, as shown in FIGS. 2, 4 and 5. The support member 18 extends a sufficient distance away from the tray bottom 12 so that the back end 19 of the drainage pan is tilted upwardly with respect to the front end 17 of the drainage pan a sufficient angle "a" to facilitate the flow of drained oil toward the drainage aperture 15 (FIG. 2). In the preferred embodiment of the invention, the support member 18 provides a one inch inclination per linear foot of tray bottom 12 length "L" and a two inch incline relative to the front end 17 of the drainage pan, although other rates of inclination known to persons skilled in the art can be used without departing from the scope of the invention. Preferably, the support member 18 is provided with a V-shaped cross-sectional configuration, as shown in FIG. 6, and extends across substantially the entire width "w" of the tray bottom 12. As is most clearly depicted in FIG. 7, one or more pairs of corresponding notched recesses, such as paired recesses 36a and 36b, can be formed along the lower end 38 of the support member 18. The paired recesses 36a and 36b are appropriately spaced from one another and from the ends of the support member 18 so as to receive therein the circumferential rim 20 of a variety of standard volume storage drums. It will be appreciated by persons skilled in the art that storage drums of different capacities have circumferential rims of differing diameters. Accordingly, the placement of the notched recesses along the lower end of the support member is adapted to correspond to a variety of drum rim diameters. As is most clearly shown in FIG. 4, the drainage pan 10 rests on top of the inlet end of the fluid storage drum 24 in such a manner that the drainage conduit 16 is inserted into the drum inlet 20 and appropriate paired recesses of the support member 18, such as paired recesses 36a, receive the drum rim 22. This arrangement securely mounts the drainage pan 10 on top of the inlet end of the drum and helps to prevent lateral displacement and tipping of the drainage pan, and therefore the spilling of pan contents.

In another embodiment of the invention, the lower interior surface of the drainage pan 10 defined by the tray bottom 12 can be configured to further facilitate the flow of fluid from the back end 19 of the drainage pan toward the drainage aperture 15. With reference to FIG. 8, the tray bottom 12 can be provided along at least a portion of its length with a plurality of outwardly-extending ridges 40. The ridges 40 are provided to support components placed into the drainage pan so that fluid drained from the components passes into tray bottom channels 42 formed between the ridges 40. The ridges 40 can be appropriately shaped to direct fluid drained into the channels 42 toward the aperture inlet 15. The ridges 40 can be formed by appropriate molding or stamping of the tray bottom 12, or they can be in the form of separate members that are appropriately affixed, as by gluing or welding, to the tray bottom 12. However, the ridges must be constructed in a suitable manner so that they can support the weight of heavy engine components such as cylinder heads.

In an alternative embodiment, as illustrated in FIG. 9-11, the drainage pan 10 can be provided with an optional drainage plate 44 for facilitating the drainage of oil from components placed in the drainage pan. The drainage plate 44 can be in the form of a rigid support member elevated above the tray bottom 12 by a plurality of feet 46 and having a plurality of perforations 48 extending therethrough, as shown in FIG. 10. The perforations 48 are provided to permit the flow of oil drained from a component placed on top of the plate 44 to the inclined tray bottom 12 so that oil drained from the component can flow freely to the inlet aperture 15 of the tray bottom. In an alternative embodiment, the drainage plate 44 can be in the form of a corrugated sheet comprised of a plurality of alternating ridges 50 and grooves 52. Components placed on the top of this drainage plate are supported by the plate ridges 50 so that oil drained from the components collects in and is conducted by the plate grooves 52 to the drainage aperture 15. Preferably, the drainage plate 44 is formed from metal or other suitably rigid material.

As will be appreciated by persons skilled in the art adaptations of the disclosed structural members described above can be made with which fall within the scope of the invention and the appended claims.

What is claimed is:

1. In a drainage pan for receiving fluid drained from one or more components positioned in the pan and transferring the fluid to a vertical conventional fluid storage drum having a sealable fluid inlet and a circumferential rim formed at, and extending above the top of the drum, the drainage pan being mountable on the top of the drum adjacent the drum inlet and comprising a tray bottom having a front and a back end, a drainage aperture formed in the tray bottom adjacent the front end of the tray bottom and tray sidewalls that extend generally vertically from the tray bottom between the front and back ends, the improvement comprising:

a drainage conduit extending substantially downwardly from the drainage aperture, the drainage conduit being insertable into the drum inlet for transferring drained fluid from the drainage pan into the storage drum; and an integral support secured to the drain bottom for supporting and elevating the back end of the drainage pan, the integral support being adapted to securely mount the drainage pan on the rim of the drum inlet.

2. A drainage pan according to claim 1, wherein the drainage conduit is a rigid tube permanently secured to the tray bottom.

3. A drainage pan according to claim 2, wherein the tube is formed from metal and is welded to the tray bottom.

4. A drainage pan according to claim 2, wherein the drainage tube is cylindrical in cross-section and is tapered along at least a portion of its length so that the free end of the conduit insertable into the drum inlet is provided with a cross-sectional diameter that is less than the cross-sectional diameter of the storage drum fluid inlet.

5. A drainage pan according to claim 1, further comprising means for restricting passage into the drainage conduit of objects having a diameter that is greater than a predetermined value.

6. A drainage pan according to claim 5, wherein the means for restricting passage into the drainage conduit comprises a strainer positioned at the drainage aperture.

7. A drainage pan according to claim 1, wherein at least a portion of the lower interior surface of the drainage pan formed by the tray bottom is provided with a plurality of spaced apart ridges.

8. A drainage pan according to claim 1, further comprising a plate member mountable in the tray bottom for facilitating the drainage of fluid from components placed in the drainage pan.

9. A drainage pan according to claim 8, wherein the plate member is provided with a plurality of spaced apart ridges with fluid collection channels formed between adjacent ridges.

10. A drainage pan according to claim 8, wherein the plate member is provided with a plurality of apertures.

11. A drainage pan according to claim 1, wherein the integral support secured to the tray bottom for supporting and elevating the back end of the drainage pan comprises a support member that extends outwardly fromt he tray bottom and across at least a portion of the width of the drainage pan.

12. A drainage pan according to claim 11, wherein the support member is provided with at least two notched recesses along its lower end, the notched recesses being arranged in pairs appropriately spaced to engage the rim of the storage drum.

13. A drainage pan according to claim 11, wherein the support member is adapted to incline the tray bottom at a rate of approximately one inch per linear foot of the tray bottom length when the drainage pan is positioned on top of the storage drum.

14. A drainage pan according to claim 11, wherein the support member has a generally V-shaped cross-section and is secured to the tray bottom so that the apex of the V-shaped support member faces in a direction away from the tray bottom.

15. A drainage pan according to claim 1, wherein the tray side wall terminates at a free end that is angled toward the side wall.

* * * * *